(12) United States Patent
Yao et al.

(10) Patent No.: US 11,843,350 B2
(45) Date of Patent: Dec. 12, 2023

(54) AUTONOMOUS SOLAR FIELD AND RECEIVER INSPECTIONS BASED ON POLARIMETRIC-ENHANCED IMAGING

(71) Applicants: Arizona Board of Regents on behalf of Arizona State University, Scottsdale, AZ (US); Sandia National Laboratories, Albuquerque, NM (US)

(72) Inventors: Yu Yao, Chandler, AZ (US); Chao Wang, Chandler, AZ (US); Julius Yellowhair, Albuquerque, NM (US); Jing Bai, Tempe, AZ (US); Jiawei Zuo, Tempe, AZ (US)

(73) Assignee: ARIZONA BOARD OF REGENTS ON BEHALF OF ARIZONA STATE UNIVERSITY, Albuquerque, NM (US)

( * ) Notice: Subject to any disclaimer, the term of this patent is extended or adjusted under 35 U.S.C. 154(b) by 460 days.

(21) Appl. No.: 17/153,769

(22) Filed: Jan. 20, 2021

(65) Prior Publication Data
US 2021/0226583 A1    Jul. 22, 2021

Related U.S. Application Data

(60) Provisional application No. 62/963,685, filed on Jan. 21, 2020.

(51) Int. Cl.
| | |
|---|---|
| *H02S 50/15* | (2014.01) |
| *B64C 39/02* | (2023.01) |
| *G06T 7/00* | (2017.01) |
| *B64U 101/30* | (2023.01) |

(52) U.S. Cl.
CPC ............ *H02S 50/15* (2014.12); *B64C 39/024* (2013.01); *G06T 7/0004* (2013.01); *B64U 2101/30* (2023.01); *G06T 2207/10032* (2013.01); *G06T 2207/10048* (2013.01)

(58) Field of Classification Search
CPC ....... H02S 50/15; H02S 50/00; B64C 39/024; G06T 7/0004; G06T 2207/10032; G06T 2207/10048; B64U 2101/30; Y02E 10/50
See application file for complete search history.

(56) References Cited

U.S. PATENT DOCUMENTS

| | | | |
|---|---|---|---|
| 8,835,831 | B2 | 9/2014 | Yu et al. |
| 8,835,905 | B2 | 9/2014 | Wober et al. |
| 2011/0285942 | A1 | 11/2011 | Guo et al. |
| 2011/0309237 | A1 | 12/2011 | Seo et al. |
| 2014/0346357 | A1 | 11/2014 | Jarrahi et al. |

(Continued)

FOREIGN PATENT DOCUMENTS

| | | | |
|---|---|---|---|
| CN | 109916516 | * | 6/2019 |
| CN | 110646102 | * | 10/2019 |

(Continued)

OTHER PUBLICATIONS

Machine translation for CN 110646102 (Year: 2019).*

(Continued)

*Primary Examiner* — Qian Yang
(74) *Attorney, Agent, or Firm* — MH2 TECHNOLOGY LAW GROUP LLP

(57) ABSTRACT

Provided herein are systems and related methods of performing solar field and receiver inspections based on polarimetric-enhanced imaging.

16 Claims, 13 Drawing Sheets

(56) References Cited

U.S. PATENT DOCUMENTS

| | | | |
|---|---|---|---|
| 2017/0301819 A1 | 10/2017 | Yao | |
| 2018/0003656 A1* | 1/2018 | Michini | H02S 50/10 |
| 2018/0309949 A1 | 10/2018 | Fossum et al. | |
| 2018/0364525 A1 | 12/2018 | Murata et al. | |
| 2020/0216683 A1* | 7/2020 | Zwicker | F24S 70/16 |
| 2021/0110571 A1* | 4/2021 | Zhu | G06T 7/60 |

FOREIGN PATENT DOCUMENTS

| | | | |
|---|---|---|---|
| CN | 110647802 | * | 1/2020 |
| WO | WO 2013/036220 | * | 3/2013 |
| WO | WO 2016/205612 | * | 12/2016 |

OTHER PUBLICATIONS

Machine translation for CN 109916516 (Year: 2019).*
Machine translation for CN 110647802 (Year: 2020).*
Afshinmanesh, F. et al., Measurement of the polarization state of light using an integrated plasmonic polarimeter, Nanophotonics 2012, 1, (2), 125-129.
Arbabi, E. et al., Full-Stokes Imaging Polarimetry Using Dielectric Metasurfaces. ACS Photonics 2018, 5 (8), 3132-3140.
Balthasar Mueller, J. P. et al., Ultracompact metasurface in-line polarimeter. Optica 2016, 3 (1), 42-47.
Bassan, P. et al., Large scale infrared imaging of tissue micro arrays (TMAs) using a tunable Quantum Cascade Laser (QCL) based microscope. Analyst 2014, 139 (16), 3856-3859.
Chen, W. T. et al., Integrated plasmonic metasurfaces for spectropolarimetry. Nanotechnology 2016, 27 (22), 224002.
Dong, J. et al., Bi-layer cross chiral structure with strong optical activity and negative refractive index. Opt. Express 2009, 17 (16), 14172-14179.
Frank, B. et al., Large-Area 3D Chiral Plasmonic Structures. ACS Nano 2013, 7 (7), 6321-6329.
Fukuda, H. et al., Silicon photonic circuit with polarization diversity. Opt. Express 2008, 16 (7), 4872-4880.
Gansel, J. K. et al., Gold Helix Photonic Metamaterial as Broadband Circular Polarizer. Science 2009, 325 (5947), 1513-1515.
Garcia, N. M. et al., Surface normal reconstruction using circularly polarized light, Opt Express 2015, 23, (11), 14391-14406.
Gruev, V. et al., CCD polarization imaging sensor with aluminum nanowire optical filters. Opt. Express 2010, 18 (18), 19087-19094.
Guo, B. et al., Laser-based mid-infrared reflectance imaging of biological tissues. Opt. Express 2004, 12 (1), 208-219.
Gurton, K.P. et al., Enhanced facial recognition for thermal imagery using polarimetric imaging. 2014; vol. 39, p. 3857-3859.
Hou-Tong, C. et al., Reports on Progress in Physics 2016, 79, (7), 076401.
Hu, J. et al., All-dielectric metasurface circular dichroism waveplate. Scientific Reports 2017, 7, 41893.
Ichimoto, K. et al., Polarization Calibration of the Solar Optical Telescope onboard Hinode. In The Hinode Mission, Sakurai, T., Ed. Springer New York: New York, NY, 2008; pp. 179-207.
Jin, L. et al., Noninterleaved Metasurface for (26-1) Spin- and Wavelength-Encoded Holograms. Nano Letters 2018, 18 (12), 8016-8024.
Kats, M. A. et al., Thin-Film Interference in Lossy, Ultra-Thin Layers. Opt. Photon. News 2014, 25 (1), 40-47.
Khorasaninejad, M. et al., Metalenses at visible wavelengths: Diffraction-limited focusing and subwavelength resolution imaging, Science 2016, 352, (6290), 1190-1194.
Kikuta et al., "Achromatic quarter-wave plates using the dispersion of form birefringence," Applied Optics, vol. 36, issue 7, Mar. 1, 1997, pp. 1566-1572.
Kunnen, B. et al., Application of circularly polarized light for non-invasive diagnosis of cancerous tissues and turbid tissue-like scattering media. Journal of Biophotonics 2015, 8 (4), 317-323.
Lee, K. et al., Ultracompact Broadband Plasmonic Polarimeter. Laser Photonics Reviews 2018, 12 (3), 1700297.
Li, W. et al., Circularly polarized light detection with hot electrons in chiral plasmonic metamaterials. Nat Commun 2015, 6, 8379.
Li, Z. S. et al., Detection of methane with mid-infrared polarization spectroscopy. Applied Physics B 2004, 79 (2), 135-138.
Liang, G. et al., Monolithic Semiconductor Lasers with Dynamically Tunable Linear-to-Circular Polarization. ACS Photonics 2017, 4 (3), 517-524.
Lueder, E., "Electro-optic Effects in Twisted Nematic Liquid Crystals," Liquid Crystal Displays : Addressing Schemes and Electro-Optical Effects, John Wiley Sons, Incorporated, 2010.
Zhu, A. Y. et al., Giant intrinsic chiro-optical activity in planar dielectric nanostructures. Light: Science &Amp; Applications 2018, 7, 17158.
Nordin et al., "Broadband form birefringent quarter-wave plate for the mid-infrared wavelength region," Optics Express, vol. 5, No. 88, Oct. 11, 1999, pp. 163-169.
PCT Written Opinion of the International Searching Authority and International Search Report dated Jun. 20, 2019 in corresponding PCT Application No. PCT/US2018/067109, 11 pages.
Sato et al., "Compact ellipsometer employing a static polarimeter module with arrayed polarizer and wave-plate elements," Applied Optics, vol. 46, No. 22, Jul. 6, 2007.
Zhao et al., "Manipulating light polarization with ultrathin plasmonic metasurfaces," Physical Review, B 84 205428, Nov. 16, 2011.
Martinez, N. J. et al., Single photon detection in a waveguide-coupled Ge-on-Si lateral avalanche photodiode Opt Express 2017, 25, (14), 16130-16139.
Nafie, L.A. et al., "Vibrational circular dichroism," Journal of the American Chemical Society, vol. 98, pp. 2715-2723, doi:10.1021/ja00426a007 (1976).
Patel, R. et al., Polarization-Sensitive Multimodal Imaging for Detecting Breast Cancer. Cancer Research 2014, 74 (17), 4685-4693.
Pfeiffer, C. et al., Bianisotropic Metasurfaces for Optimal Polarization Control: Analysis and Synthesis. Phys Rev Appl 2014, 2 (4).
Pors, A. et al., Plasmonic metagratings for simultaneous determination of Stokes parameters. Optica 2015, 2 (8), 716-723.
Roberts, K. et al., Performance of Dual-Polarization QPSK for Optical Transport Systems. Journal of Lightwave Technology 2009, 27 (16), 3546-3559.
Rubin, N. A. et al., "Matrix Fourier optics enables a compact full-Stokes polarization camera," Research Article, Science, 2019, vol. 365, No. 43, Issue 6448, 10 pages.
Rubin, N. A. et al., Polarization state generation and measurement with a single metasurface. Opt. Express 2018, 26 (17), 21455-21478.
Salomatina-Motts, E. et al., Multimodal polarization system for imaging skin cancer. Optics and Spectroscopy 2009, 107 (6), 884-890.
Schaefer, B. et al., Measuring the Stokes polarization parameters. American Journal of Physics 2007, 75 (2), 163-168.
Short, N. et al., Improving cross-modal face recognition using polarimetric imaging. Opt Lett 2015, 40 (6), 882-885.
Tamura, M. et al., First Two-Micron Imaging Polarimetry of β Pictoris, The Astrophysical Journal, 2006, 641: 1172-1177.
Tang, Y. et al., A. E., Enhanced Enantioselectivity in Excitation of Chiral Molecules by Superchiral Light. Science 2011, 332 (6027), 333-336.
Tyo, J. S. et al., Review of passive imaging polarimetry for remote sensing applications. Appl. Opt. 2006, 45 (22), 5453-5469.
Whitmore, L. et al., Protein secondary structure analyses from circular dichroism spectroscopy: Methods and reference databases. Biopolymers 2008, 89 (5), 392-400.
Wu, P. C. et al., Versatile Polarization Generation with an Aluminum Plasmonic Metasurface. Nano Letters 2017, 17 (1), 445-452.
Yang, Z. et al., Generalized Hartmann-Shack array of dielectric metalens sub-arrays for polarimetric beam profiling. Nature Communications 2018, 9 (1), 4607.
Yeh, P., "Electromagnetic Propagation in Birefringent Layered Media," J Opt Soc Am, 1979, vol. 69, No. 5, pp. 742-756.
Yu, N. et al., A Broadband, Background-Free Quarter-Wave Plate Based on Plasmonic Metasurfaces. Nano Letters 2012, 12 (12), 6328-6333.

(56) References Cited

OTHER PUBLICATIONS

Basiri et al. "Ultrafast Mid-Infrared Optical Modulator Based On Optically Controlled Graphene-Integrated Metasurface," Optica Publishing Group, 2020, 2 pages.
Behadur, Birendra. "Liquid Crystal Displays," Molecular Crystals and Liquid Crystals, 1984, 109 (1), pp. 3-93.
Stephens, Philip J. "Vibrational Circular Dichroism Spectroscopy: A New Tool for the Stereochemical Characterization of Chiral Molecules," ChemInform, 2004, 35 (27), pp. 699-725.
Yang et al. "Vibrational Circular Dichroism Spectroscopy of Chiral Molecules," Top Curr Chem, 2011, 298, pp. 189-236.
Yu, N. et al., Flat optics with designer metasurfaces. Nature Materials 2014, 13, 139.
Zhao, X. et al., Circle polarization shift keying with direct detection for free-space optical communication. Journal of Optical Communications and Networking 2009, 1 (4), 307-312.
Zhao, Y. et al., Chirality detection of enantiomers using twisted optical metamaterials. Nature Communications 2017, 8, 14180.
Zhao, Y. et al., Twisted optical metamaterials for planarized ultrathin broadband circular polarizers. Nature Communications 2012, 3, 870.
Zheng, G. et al., Metasurface holograms reaching 80% efficiency. Nature Nanotechnology 2015, 10, 308.
Bao, Q. Loh, K. P., "Graphene Photonics, Plasmonics, and Broadband Optoelectronic Devices," ACS Nano 6, 3677-3694, (2012).
Kuramochi, H. er al., "Probing the early stages of photoreception in photoactive yellow protein with ultrafast time-domain Raman spectroscopy," Nature Chemistry 9, 660-666, (2017).
He, F. et al., "Femtosecond laser fabrication of monolithically integrated microfluidic sensors in galss," Sensors 14, 19402-19440 (2014).
Brunner, D. er al., "Parallel photonic information processing at gigabyte per second data rates using transient states," Nature Communications 4, 1364, (2013).
Sun et al., "Optiocal modulators with 2D layered materials," Nature Photonics 10, 227-238, (2016).
Chen J.-H. et al., "An all-optical modulator based on a stereo graphene-microfiber structure," Light: Science Applications 4, (2015).
Guo, Q. et al., "Universal Near-Infrared and Mid-Infrared Optical Modulation for Ultrafast Pulse Generation Enabled by Colloidal Plasmonic Semiconductor Nanocrystals," ACS Nano 10, 9463-9469, (2016).
Ding, L. et al., "All-Optical Modulation in Chains of Silicon Nanoantennas," ACS Photonics 7, 1001-1008, (2020).
Afinogenov et al., "Ultrafast All-Optical Light Control with Tamm Plasmons in Photonic Nanostructures," ACS Photonics 6, 844-850, (2019).
Shen, L. et al., "Two-photon absorption and all-optical modulation in germanium-on-silicon waveguides for the mid-infrared," Opt. Lett. 40, 2213-2216, (2015).
Wu, R. et al., "All-Optical Modulation and Ultrafast Switching in MWIR with Sub-Wavelength Structured Silicon," Applied Sciences 9, 1808 (2019).
Yu, J.-P. et al., "Accelerating terahertz all-optical modulation by hot carriers effects of silver nanorods in PVA film," AIP Advances 9, 075017, (2019).
Reed, G. T. et al., "Silicon optical modulatorsm" Nature Photonics 4, 518-526, (2010).
Schönenberger, S. et al., "Ultrafast all-optical modulator with femtojoule absorbed switching energy in silicon-on-insulator," Opt. Express 18, 22485-22496, (2010).
Manolatou, C. et al., "All-optical silicon modulators based on carrier injection by two-photon absorption," Journal of Lightwave Technology 24, 1433-1439, (2006).
Almeida, V. R. et al., "All-optical control of light on a silicon chip," Nature 431, 1081-1084, (2004).
Liu, A. et al., "High-speed optical modulation based on carrier depletion in a silicon waveguide," Opt. Express 15, 660-668 (2007).
Xu, Q. et al., "12.5 Gbit/s carrier-injection-based silicon micro-ring silicon modulators," Opt. Express 15, 430-436, (2007).

Feng, D. et al., "High speed GeSi electro-absorption modulator at 1550 nm wavelength on SOI wavelength," Opt. Express 20, 22224-22232 (2012).
Watts, M. R. et al., Ultralow power silicon microdisk modulators and switches, 2008 5th IEEE international conference on group IV photonics. 4-6 (IEEE).
Baba, T. et al. "Slow-light Mach-Zehnder modulators based on Si photonic crystals," Science and technology of advanced materials 15, 024602 (2014).
Li, W. et al., "Ultrafast All-Optical Graphene Modulator," Nano Letters 14, 955-959, (2014).
Sun, F. et al., "The all-optical modulator in dielectric-loaded wavelength with graphene-silicone heterojunction structure," Nanotechnology 29, 135201, (2018).
Dash, A. et al., "Enhanced all-optical cavity-tuning using graphene," Opt. Express 27, 34093-34102, (2019).
Sun, F. et al., "All-optical modulator based on a graphene-plasmonic slot waveguide at 1550 nm," Applied Physics Express 12, 042009, (2019).
Wen, Q-Y. et al., "Graphene based All-Optical Spatial Terahertz Modulator," Scientific Reports 4, 7409, (2014).
Tasolamprou, A. C. et al., "Experimental Demonstration of Ultrafast THz Modulation in a Graphene-Based Thin Film Absorber through Negative Photoinduced Conductivity," ACS Photonics 6, 720-727, (2019).
Yao, Y et al., "Wide Wavelength Tuning of Optical Antennas on Graphene with Nanosecond Response Time," Nano Letters 14, 214-219, (2014).
Yao, Y et al., "Electrically Tunable Metasurface Perfect Absorbers for Ultrathin Mid-Infrared Optical Modulators," Nano Letters 14, 6526-6532, (2014).
Ulstrup, S. et al., "Ultrafast electron dynamics in epitaxial graphene investigated with time-and angle-resolved photoemission spectroscopy," Journal of Physics: Condensed Matter 27, 164206 (2015).
Gierz, I. et al., "Snapshots of non-equilibrium Dirac carrier distributions in graphene," Nature materials 12, 1119-1124 (2013).
Lui, C. H. et al., "Ultrafast Photoluminescence from Graphene," Physical Review Letters 105, 127404, (2010).
Flueraru et al. "Error Analysis of a Rotating Quarter-Wave Plate Stokes' Polarimeter," IEEE Transactions on Instrumentation and Measurement, vol. 57, No. 4, Apr. 2008, 5 pages.
Basiri et al. "Nature-inspired chiral metasurfaces for circular polarization detection and full-Stokes polarimetric measurements," Light: Science & Applications Accepted, 2019, 11 pages.
Christian et al. "Probabilistic Analysis to Quantify Optical Performance and Error Budgets for Next Generation Heliostats," Journal of Solar Energy Engineering, vol. 137, Jun. 2015, 8 pages.
Collado F.J. "Preliminary design of surrounding heliostat fields", Renewable Energy, vol. 34, No. 5., May 1, 2009, p. 1359-1363.
Noone et al. "Heliostat field optimization: A new computationally efficient model and biomimetic layout," Solar Energy, vol. 86, 2012, 86, pp. 792-803.
Eddhibi et al. "Optical study of solar tower power plants," J. Phys.: Conf. Ser. 596, 2015, 8 pages.
Kistler, B. L. "A User's Manual for DELSOL3: A Computer Code for Calculating the Optical Performance and Optimal System Design for Solar Thermal Central Receiver Plants," Sandia National Laboratories, Sandia Report No. SAND 86-8018, 1986, 239 pages.
Gurton et al. "Measured Degree of Infrared Polarization for a Variety of Thermal Emitting Surfaces," Army Research Laboratory, Adelphi, MD, Jun. 2004, 34 pages.
Hu et al. Polarization: Measurement, Analysis, and Remote Sensing XIII, Jun. 21, 2018, full document.
Perkins et al. "Signal-to-noise anaylsis of Stokes parameters in division of focal plane polarimeters," Optics Express, vol. 18, No. 25, Dec. 6, 2010, 10 pages.
"Bossa Nova Vision, Salsa, Full Stokes polarization camera," 2022 [retreived on Jan. 27, 2022]. Retreived from the internet: <URL: https://www.bossanovavision.com/homepage/polarization-cameras/salsa/>.

(56) References Cited

OTHER PUBLICATIONS

Gruev et al. "Dual-tier thin film polymer polarization imaging sensor," Optics Express, vol. 18, No. 18, Aug. 30, 2010, 12 pages.

\* cited by examiner

FRONT VIEW

SIDE VIEW

AUTONOMOUS SOLAR FIELD AND RECEIVER INSPECTIONS BASED ON POLARIMETRIC-ENHANCED IMAGING

CROSS-REFERENCE TO RELATED APPLICATIONS

This application claims the benefit of, and relies on the filing date of U.S. Provisional Patent Application No. 62/963,685, filed on Jan. 21, 2020, the entire disclosure of which is incorporated herein by reference.

TECHNICAL FIELD

This disclosure relates to apply polarimetric-enhanced imaging systems for efficient and accurate autonomous field inspections.

BACKGROUND

During typical operation of a concentrating solar power (CSP) plant, a large portion of the energy (~45%) can be lost due to various imperfect conditions, such as blocking, shading, mirror soiling, tracking and canting errors, etc. Among factors that determine CSP collector instantaneous optical efficiency, the energy loss from non-perpendicular solar incidence on the heliostats and error in tracking the sun path during a day accounts for ~20% optical loss. The mirror reflectance is an average 87.8% between washings due to soiling, much smaller than that of a clean mirror (as high as 93-96%). The spillage efficiency is often assumed high (~99%), but in practice the operations can be far less ideal and much larger than 1% loss occurs as a result of heliostat canting and alignment errors. Currently, the inspection of CSP collectors typically relies on conventional imaging techniques or human eyes. However, neither provides the required accuracy and speed, thus resulting in a large loss in optical efficiency due to tracking error, mirror soiling (~5%), alignment error and defects (1% to 1.5%). Additionally, small cracks on solar absorber tubes and CSP plant piping can rapidly propagate and subsequently cause final failure. However, the current imaging methods do not provide sufficient contrast to identify small defects before propagation.

SUMMARY

This disclosure relates to systems and methods for polarization-based autonomous concentrating solar power (CSP) inspection that allow fast, high-contrast, and accurate inspection of collector fields and receivers. Embodiments combine intensity and polarization-based detection of heliostat edges and corners, thereby enabling fast and accurate detection of heliostat optical errors using drone-based techniques for autonomous inspections and improving solar field collector efficiency, in particular with regard to CSP plants where the canting, tracking, and aiming are less than ideal. The autonomous detection of soiling conditions and defects improves efficiency in scheduling heliostat washing and repair, and accordingly increases the solar-weighted heliostat reflectance and collector optical efficiency. Infrared polarimetric imaging, in combination with thermal and visible imaging, allows early detection of receiver defects before damage, thereby extending the receiver lifetime.

Advantages of the described embodiments include but are not limited to the following. Visible full-stokes polarimetric images provide higher contrast for mirror edges, corners, scratches, cracks, and soiling. Both visible and infrared (thermal) polarimetric images provide higher contrast for solar receiver tube cracks and scratches. Integration of polarimetric imagers onto drones allows realization of autonomous field inspection in CSP plants, instead of labor-intensive slow inspection carried out by humans.

Systems and methods described herein combine intensity and polarization information of optical images to realize high speed and accurate detection of heliostat edges and corners, which can be used for quick evaluation of heliostat optical errors based on optical models developed for heliostats. This is particularly applicable for CSP plants where the canting, tracking, and aiming is less than ideal and can ultimately reduce optical loss due to canting and tracking errors and increase energy efficiency up to >1% (best-effort performance). The autonomous detection of soiling conditions and defects can improve the efficiency in scheduling heliostat washing and repair, and as a result, can potentially increase the solar-weighted heliostat reflectance and the collector optical efficiency up to 4%. Visible and infrared polarimetric imaging, in combination with thermal and visible imaging, allow early detection of receiver defects before damage and thus extending the receiver lifetime. This will mark a new direction towards increasing the receiver lifetime towards at least a 40-year span.

The details of one or more embodiments of the subject matter of this disclosure are set forth in the accompanying drawings and the description. Other features, aspects, and advantages of the subject matter will become apparent from the description, the drawings, and the claims.

In another aspect, the present disclosure provides an imaging system that includes a plurality of imaging devices configured for imaging visible and infrared wavelengths received from one or more components of a solar power plant. The system also includes a controller operably connected, or connectable, to the plurality of imaging devices, which controller comprises, or capable of accessing, computer readable media comprising non-transitory computer executable instructions which, when executed by at least one electronic processor, perform at least: receiving one or more visible and infrared images of the one or more components of the solar power plant from the plurality of imaging devices, and identifying one or more errors, defects, and/or soiling conditions of the one or more components of the solar power plant from the one or more visible and infrared images. In some embodiments, one or more of the plurality of imaging devices are mounted onto unmanned autonomous vehicles (UAVs). In some embodiments, the solar power plant comprises a concentrating solar power plant (CSP). In some embodiments, one or more of the plurality of imaging devices are mounted onto one or more power towers of the CSP. In some embodiments, one or more of the plurality of imaging devices comprise polarimetric imaging devices. In some embodiments, the polarimetric imaging devices comprise one or more full-stokes polarimetric imaging sensors. In some embodiments, one or more of the plurality of imaging devices comprise one or more integrated silicon metasurfaces with metallic nanowire polarizers. In some embodiments, one or more of the plurality of imaging devices comprise one or more CMOS image sensors. In some embodiments, the controller is configured to identify the one or more errors, defects, and/or soiling conditions in less than about 1 second of receiving the receiving the one or more visible and infrared images and with a probability of detection of more than about 0.95. In some embodiments, the controller is configured to receive different polarization parameters selected from the group consisting of: intensity, degree of linear polarization (DOLP), angle of polarization (AOP), Stokes parameters ($S_1$, $S_2$, $S_3$), and degree of polarization (DOP).

In another aspect, the present disclosure provides a method of conducting an autonomous solar power field inspection using a plurality of imaging devices. The method includes receiving one or more visible and infrared images of one or more components of the solar power plant from the plurality of imaging devices. The method also includes identifying one or more errors, defects, and/or soiling conditions of the one or more components of the solar power plant from the one or more visible and infrared images. In some embodiments, one or more of the plurality of imaging devices are mounted onto unmanned autonomous vehicles (UAVs).

BRIEF DESCRIPTION OF DRAWINGS

FIG. 7A is an optical image taken by a conventional camera. FIG. 7B is an AOP image taken by a visible polarimetric imager. FIG. 7C is a thermal image of the object in FIG. 7D taken by a thermal polarimetric imager (scale bar: 1 cm).

DETAILED DESCRIPTION

This disclosure describes ultra-compact polarimetric imaging systems for efficient and accurate autonomous concentrating solar power (CSP) field inspections. Implementations include ultra-compact chip-integrated full-stokes polarimetric imaging devices for visible and infrared wavelengths. The polarimetric imagers can be mounted onto drones, i.e., unmanned autonomous vehicles (UAVs) or CSP power towers for continuous field monitoring and inspections. Applications of the ultra-compact polarimetric imaging systems include detection of edges and corners of heliostats and facets, monitoring of mirror soiling and quantitative reporting of solar-weighted reflectance, and inspection and monitoring of receivers for hot spots, tube defects, and paint degradation in visible and infrared ranges to provide temperature and polarization-based inspection.

Figure 1:
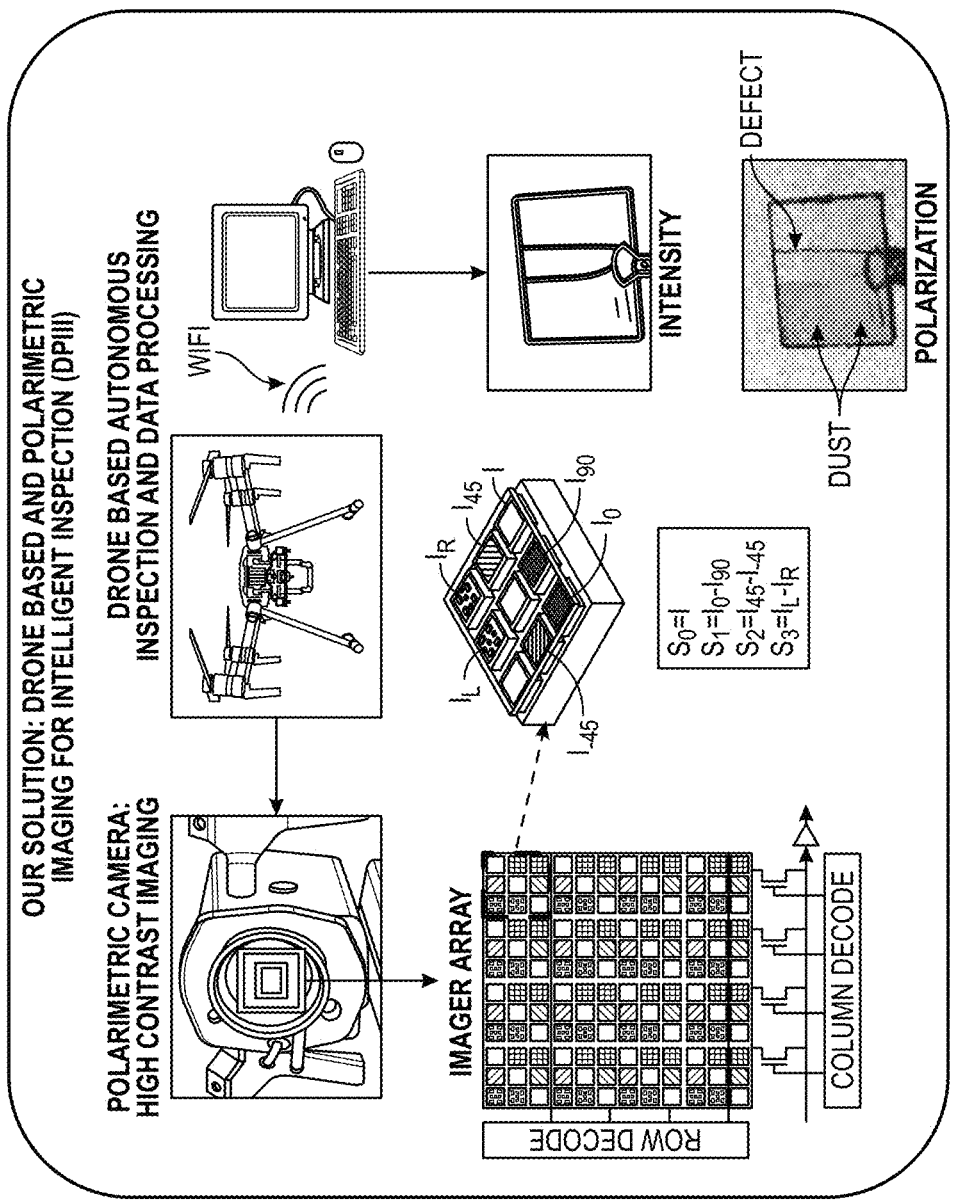
FIG. 1 depicts an example of a system for drone-based and polarimetric imaging for intelligent inspections of concentrating solar power (CSP).

FIG. 1 depicts an example of a system for drone-based and polarimetric imaging for intelligent inspections of concentrating solar power (CSP) plants. The system 100 depicted in FIG. 1 is configured to achieve >95% success rate of detecting heliostat edges and corners with a detection speed <1 second, increase optical efficiency of collector fields by >5% by improving spillage efficiency and mirror clearness, detect the peak flux of receiver tubes within 5% accuracy, identify defects before catastrophic damage, reduce maintenance cost, and improve inspection speed of CSP plants.

Combining drone-based techniques with intensity and polarization-based detection of heliostat edges and corners allows fast and accurate detection of heliostat optical errors, thereby improving solar field collector efficiency, which can be particularly important for CSP plants in which canting, tracking, and aiming are less than ideal. The autonomous detection of soiling conditions and defects improves the efficiency in scheduling heliostat washing and repair, and accordingly increases the solar-weighted heliostat reflectance and the collector optical efficiency. Infrared polarimetric imaging, in combination with thermal and visible imaging, allows early detection of receiver defects before damage, thereby extending receiver lifetime.

Figure 2A:
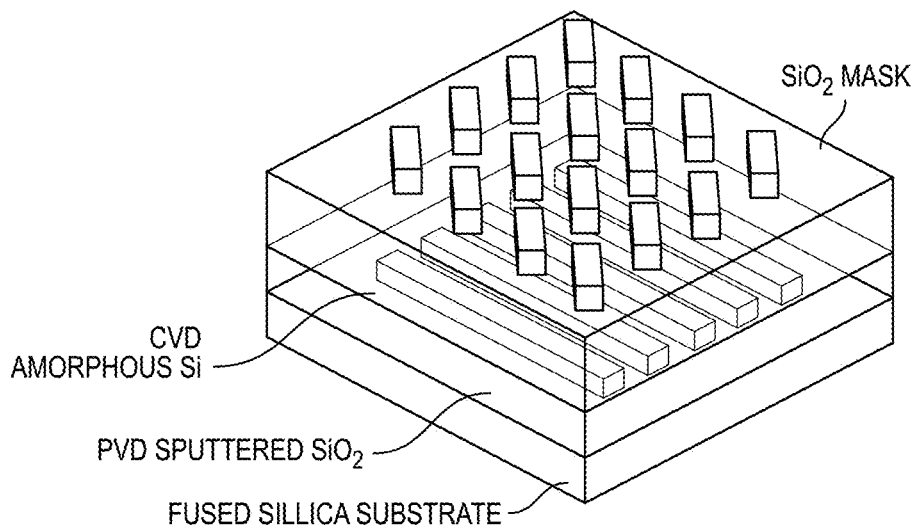
FIGS. 2A-2D show aspects of polarization detection by an integrated silicon metasurface with metallic nanowire polarizers.
Figure 2B:
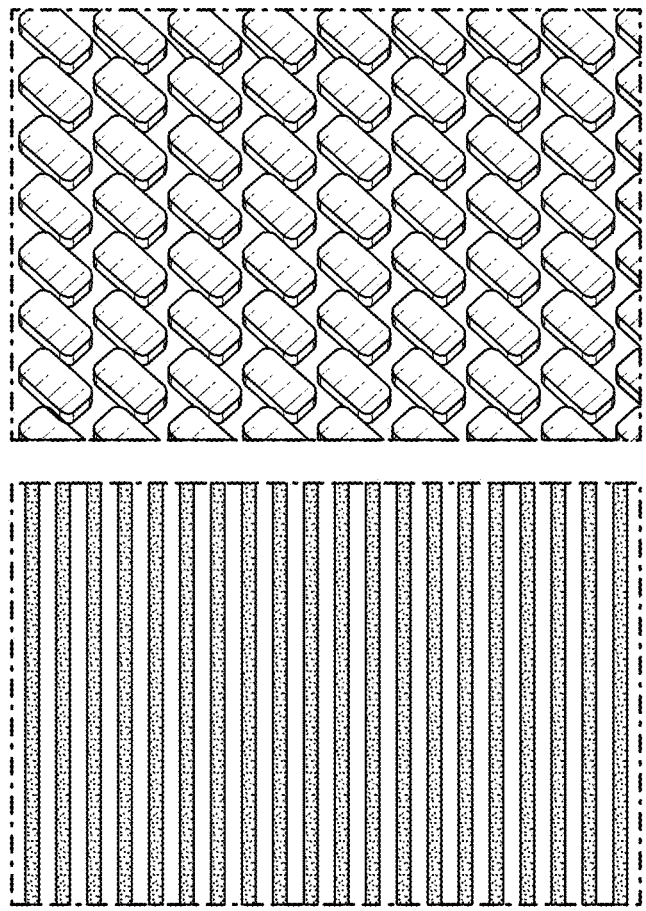
Figure 2C:
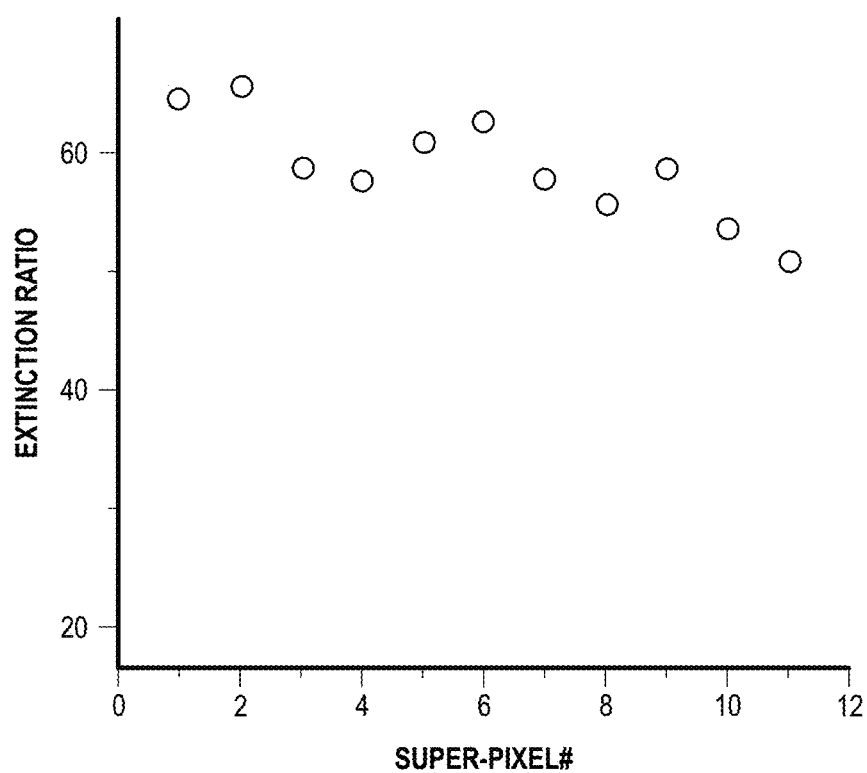
Figure 2D:
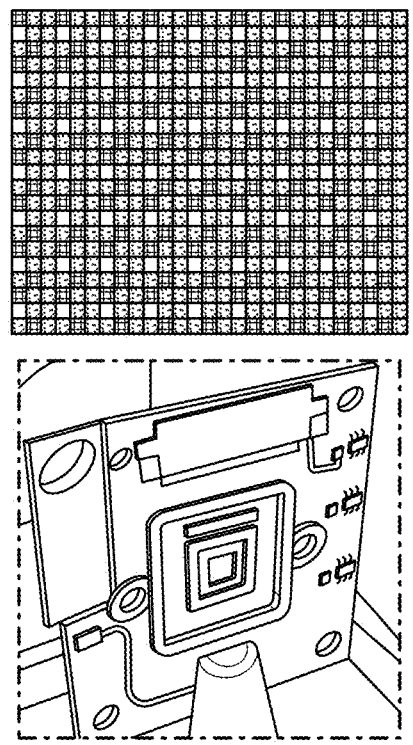

Systems including hybrid metasurface structures for ultra-compact circular polarization filters with large extinction ratio are described, in which rotation of the chip is not required. FIGS. 2A-2D show aspects of polarization detection by an integrated silicon metasurface with metallic nanowire polarizers. FIG. 2A depicts a metasurface structure integrated on a fused silica substrate. FIG. 2B shows scanning electron microscope (SEM) images of a fabricated silicon metasurface and nanograting array. FIG. 2C shows extinction ratios >30 of 12 pixels in the metasurface-based polarization filter array, measured with a filter centered around 630 nm with 50 nm bandwidth. Extinction ratios >30 have been demonsrated for visible light and transmission efficiency >60%. The metasurface-based CP filters have been integrated with nanograting-based LP filters onto a CMOS imager to realize a polarimetric imaging sensor (imaging speed >60 fps). FIG. 2D (top) shows an array imaged using a linear polarization incidence. FIG. 2D (bottom) shows a prototype polarimetric imaging array (32 by 32).

Chip-integrated full-stokes polarimetric imaging can be achieved via integrating rationally designed nanostructures directly onto CMOS image sensors. Device designs for IR cameras have been demonstrated. With a single shot, these cameras can obtain complete polarization information for each pixel, i.e., all four stokes parameters, and only simple mathematic operations are typically needed to generate polarimetric images for various parameters, such as DOP, DOLP, DOP, AOP, and the like.

Systems and methods of this disclosure include full-stokes polarimetric imaging systems with the same volume factor and weight as conventional imaging systems, which can be integrated onto drones (UAVs) or solar towers as conventional cameras without extra cost or efforts. These systems can be used to realize fast (<1 s) and accurate detection (probability of detection: >0.95) of mirror edges and corners to minimize mirror tracking and pointing errors, as well as autonomous detection of mirror defects and soiling conditions to assist system maintenance and minimize the optical loss >5%) in mirror reflection of heliostats. Solar receiver tubes can also be monitored in-situ to avoid failure due to defects formation.

Figure 3A:
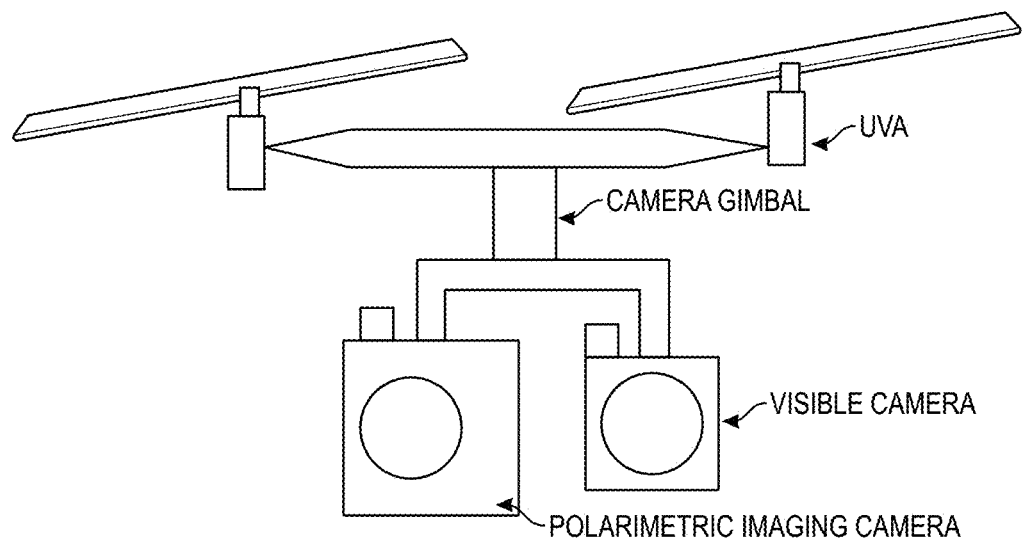
FIGS. 3A and 3B depict front and side views, respectively, of polarimetric imaging drones.
Figure 3B:
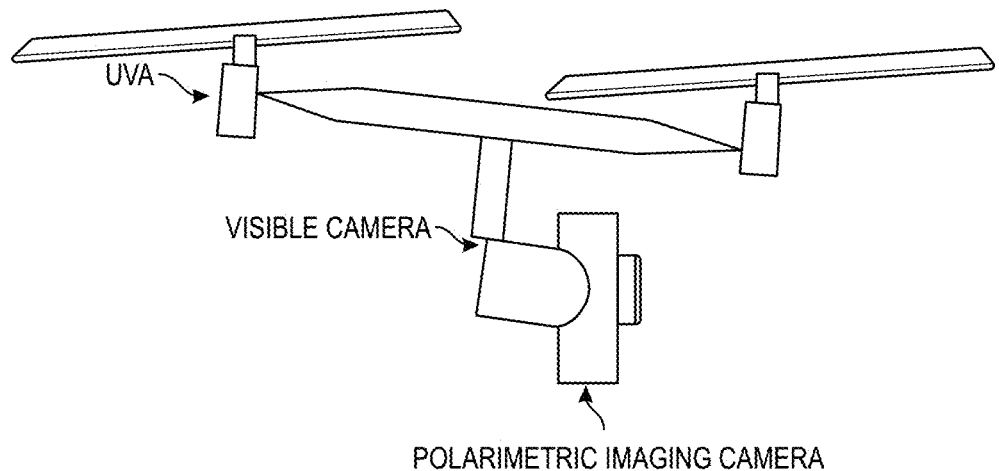
Figure 4A:
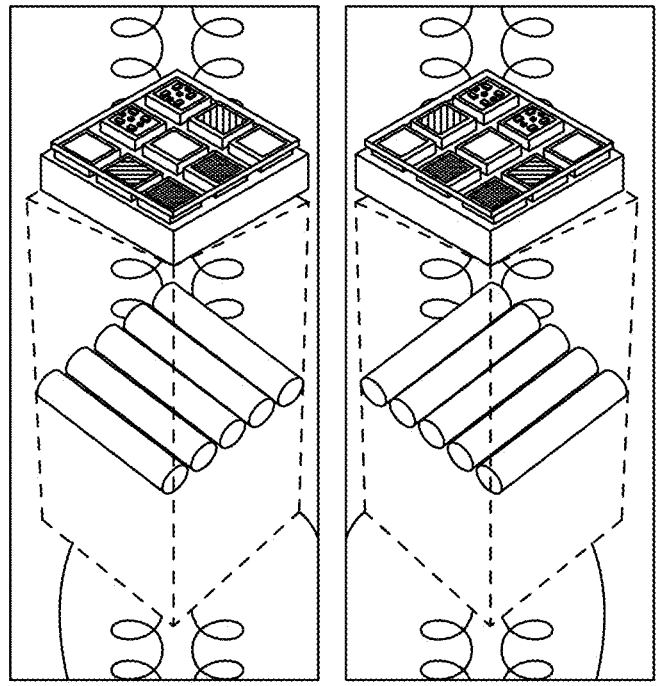
FIG. 4A-E shows an overview of a full-stokes polarimetric imaging sensor.
Figure 4B:
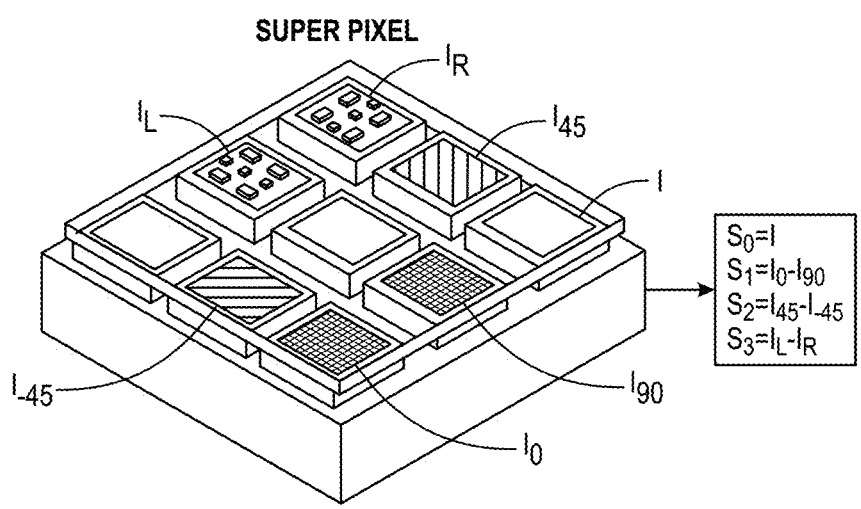
Figure 4C:
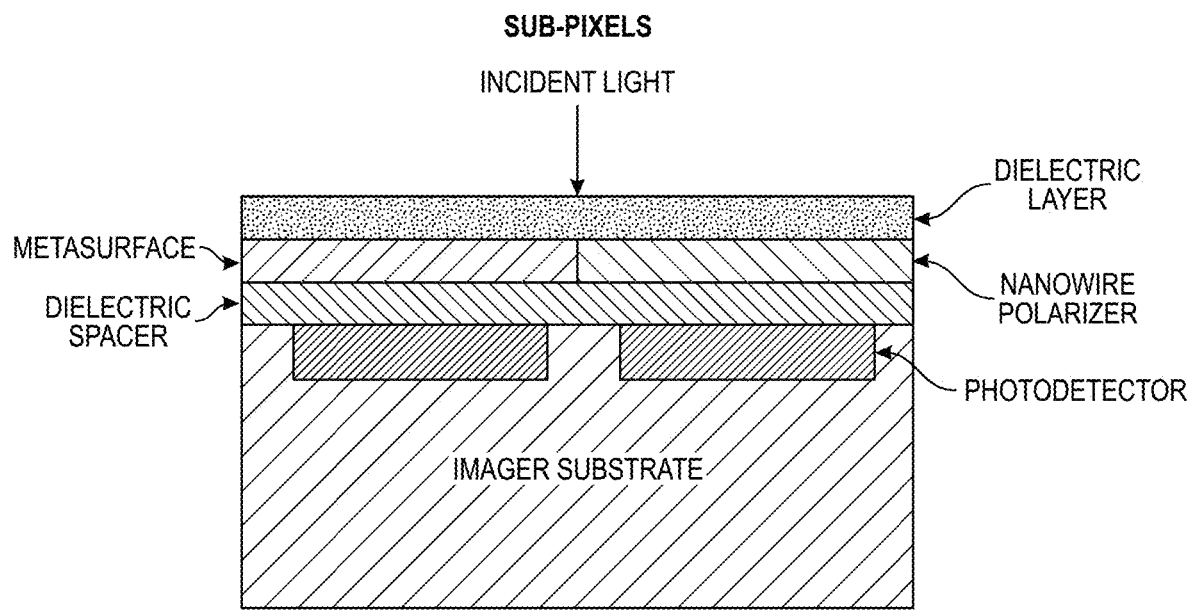
Figure 4D:
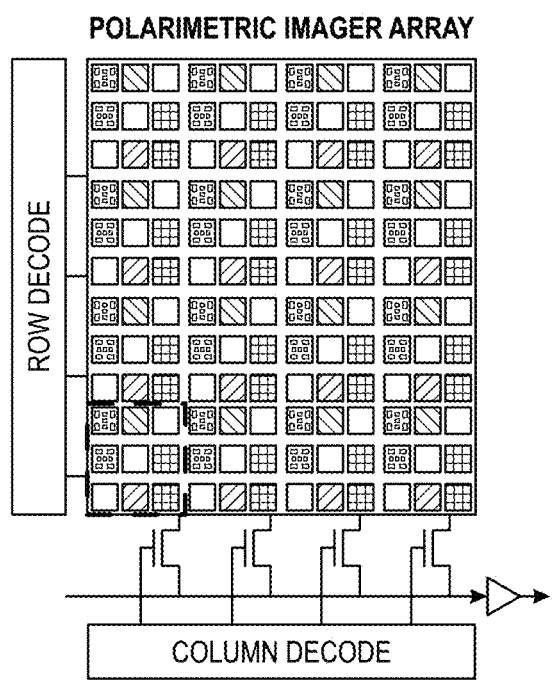
Figure 4E:
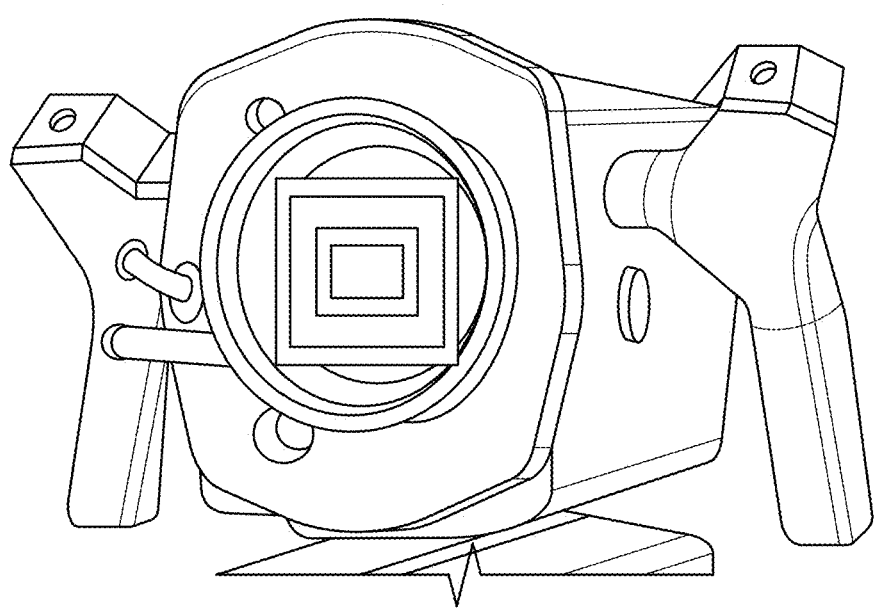

FIGS. 3A and 3B depict front and side views, respectively, of polarimetric imaging drones. The polarimetric imaging drones include a UAV (Unmanned aerial vehicle), visible camera, polarimetric imaging camera, and camera gimbal for stabilization for good image quality. The polarimetric imaging sensor can be a full-stokes polarimetric imaging sensor or a commercially available sensor with similar functions (linear polarization camera by Sony or liquid crystal based polarimetric imaging sensor (e.g., Salsa), or the like).

FIGS. 4A-4E show an overview of a full-stokes polarimetric imaging sensor.

Figure 5A:
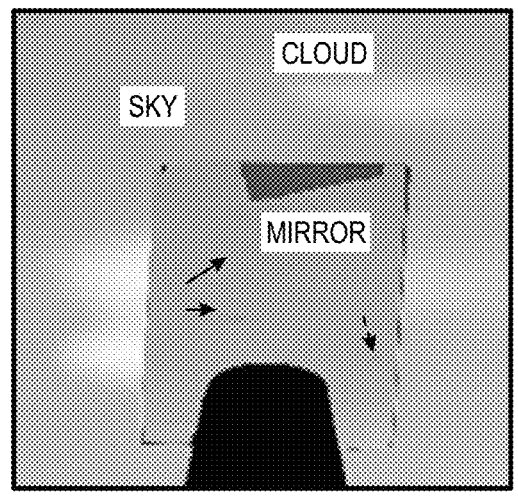
FIG. 5A shows an image of a mirror in the background of blue sky and clouds. The arrows indicate the scratches or dust particles on the mirror surface.
Figure 5B:
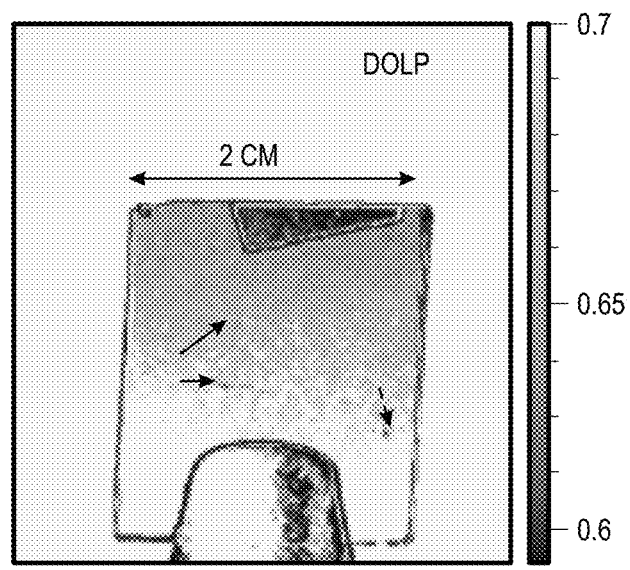
FIGS. 5B and 5C show DOLP and AOP images of the mirror, respectively.
Figure 5C:
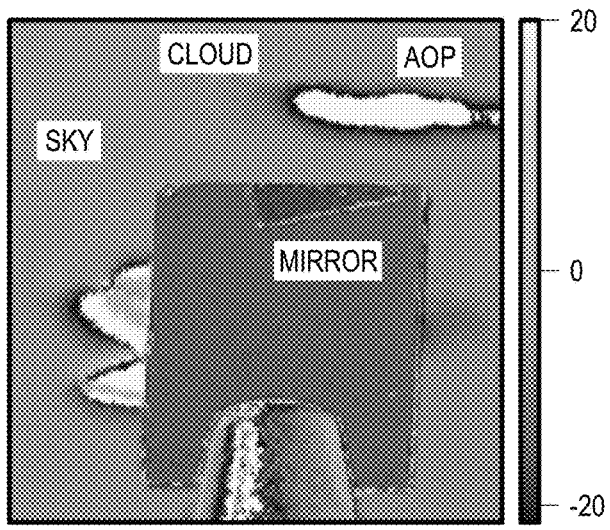
Figure 5D:
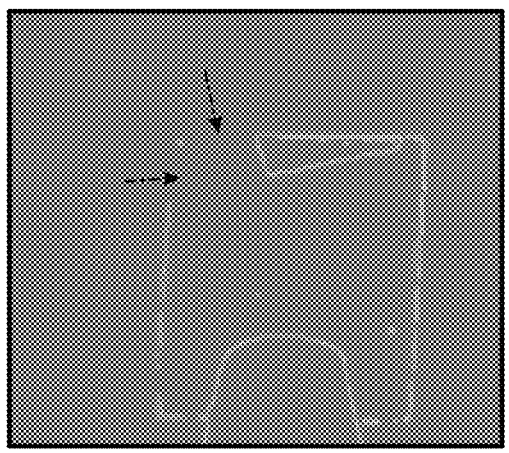
FIGS. 5D and 5E show edge detection images obtained by standard algorithm from FIGS. 5A and 5B, respectively.
Figure 5E:
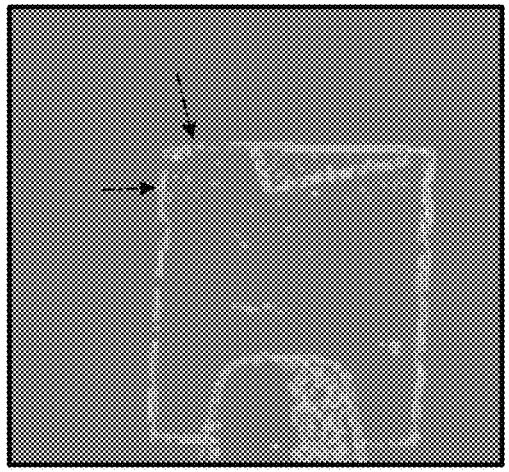

A conventional image with a standard camera (FIG. 5A) and polarimetric images with a polarimetric imaging system (FIGS. 5B and 5C) were taken of a mirror in the background of a blue sky and clouds. Before the test, a deep scratch and a shallow scratch and some dust particles were provided to the mirror surface, as indicated by the arrows on FIG. 5A. From the polarimetric image sensor, one can obtain multiple images showing different polarization parameters, such as intensity (same as conventional images), degree of linear polarization (DOLP, FIG. 5B), angle of polarization (AOP, FIG. 5C), Stokes parameters ($S_1$, $S_2$, $S_3$) and degree of polarization (DOP), etc. One can select the images with the best contrast for various purposes. In one example, it was found that the image of DOLP shows superior contrast than other images for defects and edge detection. Using a standard edge detection algorithm (Canny in Matlab), results from intensity image (FIG. 5D) show missing edges and corner (top left corner of the mirror, indicated by arrows) due to low contrast, while the DOLP image clearly displays all edges and corners (FIG. 5E). Additionally, its high contrast also makes it possible to identify the deep scratch and scatters introduced on the mirror surface. Interestingly, although the AOP image is not ideal for identification of edges, corners, and defects, it has a superior contrast to distinguish the sky, clouds and the mirror. This may serve to provide a good reference for cloud tracking purposes.

Figure 6A:
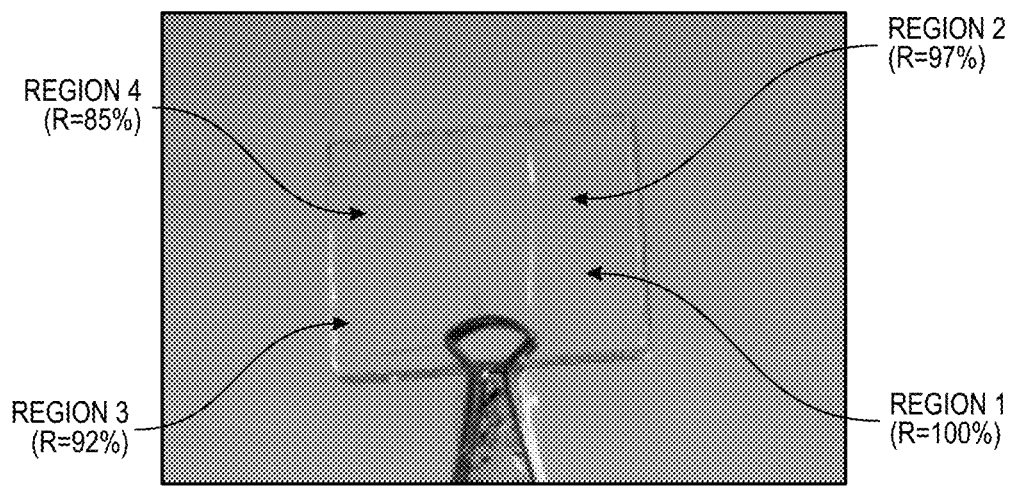
FIG. 6A shows mirror (5×5 $cm^2$) image in blue sky background taken with a conventional camera.
Figure 6B:
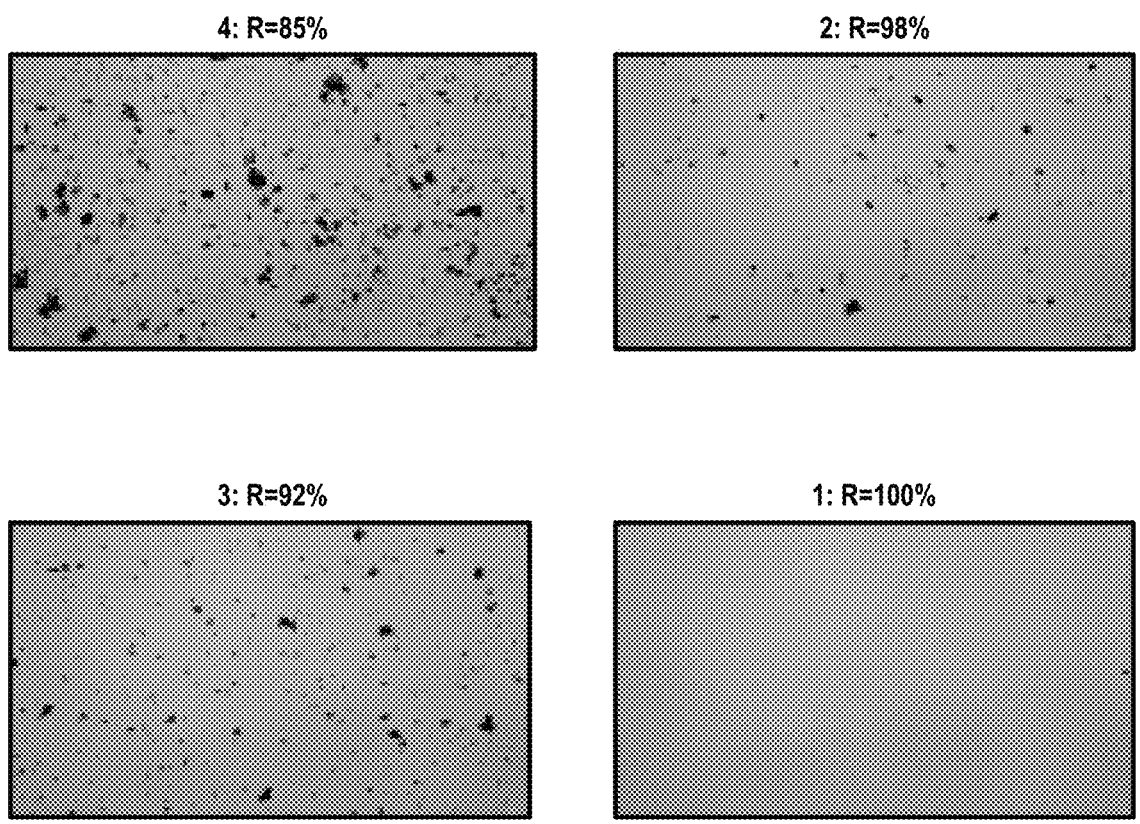
FIG. 6B shows the corresponding microscope images.
Figure 6C:
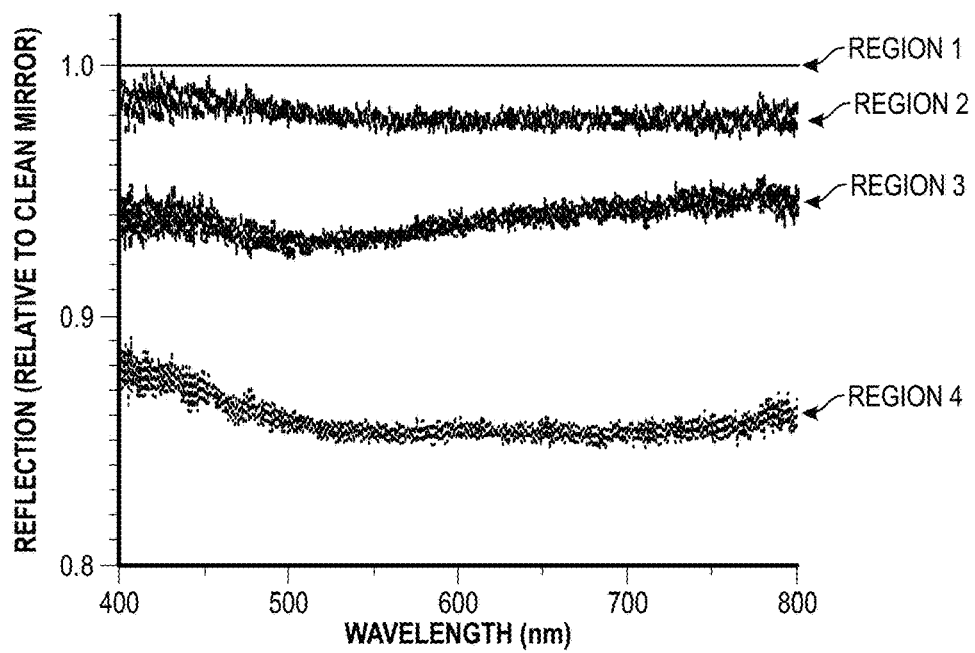
FIG. 6C shows reflection spectra of mirror surfaces with four different soiling conditions.
Figure 6D:
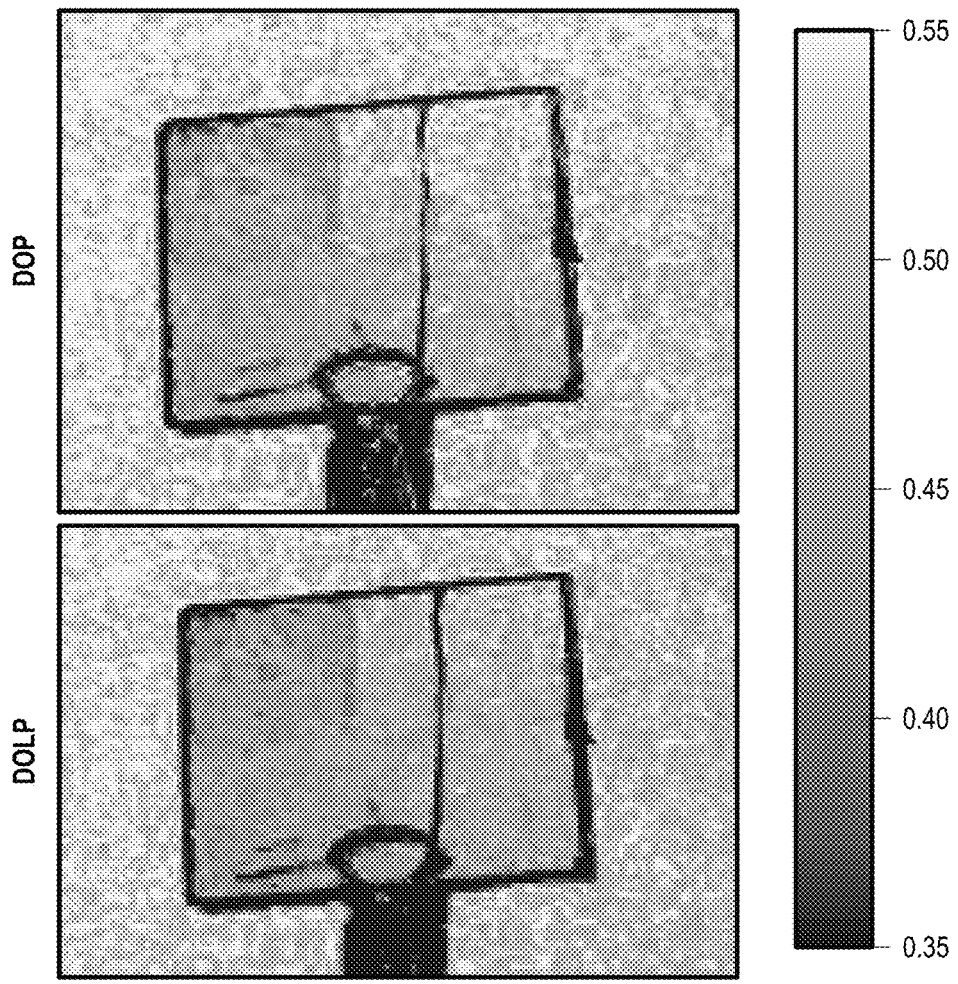
FIG. 6D show DOP and DOLP images taken by the full-stokes polarimetric imaging setup.

Preliminary studies were conducted to analyze the mirror soiling condition. A piece of mirror from a broken CSP collector was obtained, and four soiling conditions were generated by blowing sand onto four parts of the mirror with a hairdryer (FIG. 6A). Microscope images are shown in FIG. 6B. Reflection spectra of mirror surfaces with four different soiling conditions are shown in FIG. 6C. Analysis of the polarimetric imaging results revealed that the DOP image (FIG. 6D) shows the best contrast between clean mirror surface (Region 1, R=100%, average SOP=0.53) and dirty mirror surface (Region 3 and 4 with R=92%, 85%, average SOP=0.42, 0.47, respectively). The DOLP image (FIG. 6D) does not show as much contrast for Regions 3 and 4.

Figure 7A:
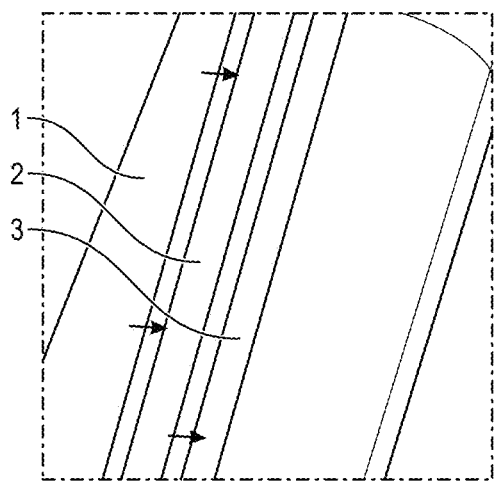
FIGS. 7A-7D show images related to polarimetric imaging of solar receiver tubes.
Figure 7B:
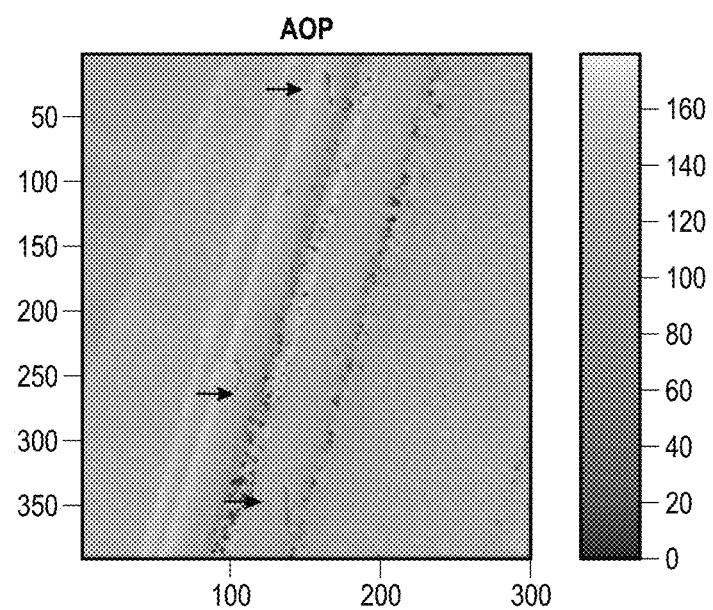
Figure 7C:
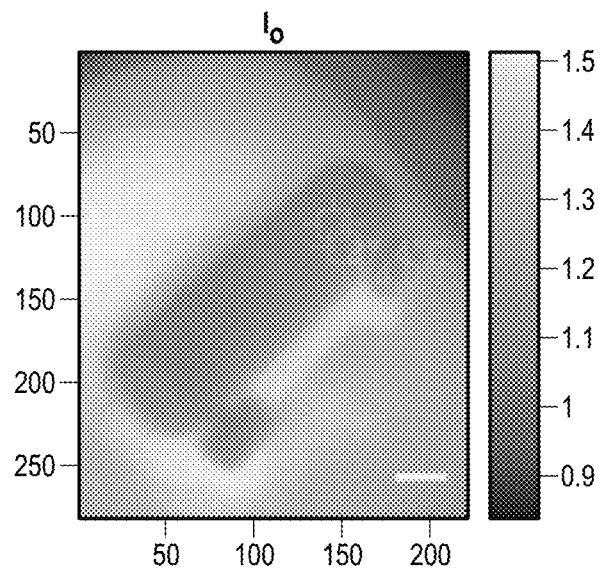
Figure 7D:
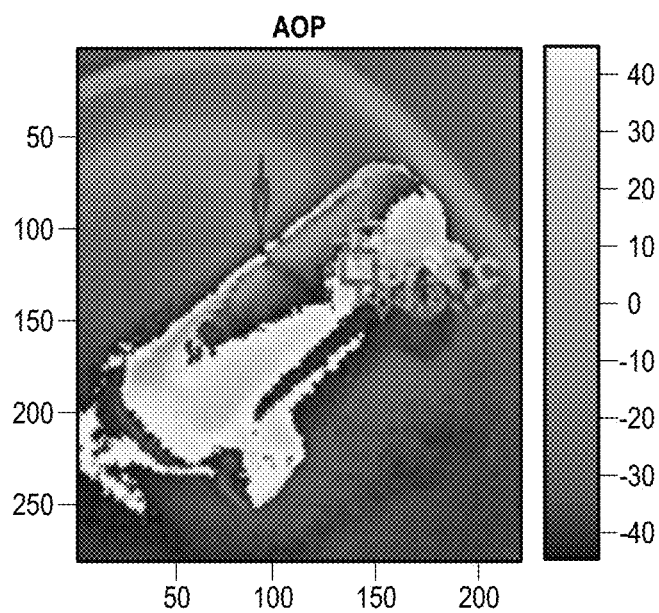

Solar receiver tubes were created by spraying black paint onto metallic tubes to achieve a black surface as shown in FIG. 7A. Conventional visible images of these tubes usually do not show strong contrast for cracks or scratches unless there is a strong color contrast. In comparison, the SOP image taken by a visible polarimetic camera shows strong contrast for all scratches indicated by arrows on the image (FIG. 7B), independent of color contrast. Comparison of polarimetric thermal images and conventional thermal images (FIGS. 7C and 7D, respectively) revealed that the polarimetric thermal images revealed cracks which were not visible in the conventional thermal images.

An autonomous monitoring system can include polarimetric imaging drones, algorithms for autonomous detection, and measurement protocol. Such autonomous monitoring systems allow more frequent and accurate inspection of collector field errors (mirror canting/tracking errors, mirror scratches, mirror cracks, etc), mirror soiling conditions, receiver tube defects (scratches, cracks, etc.), and facilitate more effective maintenance as needed. Thus, these systems can reduce the energy loss (due to collector field errors, mirror soiling) and major failure of receiver tubes in typical CSP plants, ultimately leading to higher energy efficiency (best effort performance >5%). The systems can be scaled up (with a larger number of drones) to provide regular inspection of Mega Watt CSP plants.

Preliminary studies verified that the proposed full-stokes polarimetric imaging can provide better image contrast than conventional imagers for detection of mirror edge, corner, scratches, cracks, soiling condition and receiver defects.

Polarimetric Imaging with High Contrast for Mirror Edges, Corners, Scratches and Cracks A conventional image with a standard camera and polarimetric images of a mirror in the background of a blue sky and clouds were taken. Before the test, a deep scratch, a shallow scratch, and some dust particles were introduced on the mirror surface. From the polarimetric image sensor, one can obtain multiple images showing different polarization parameters, such as intensity (same as conventional images), degree of linear polarization (DOLP), angle of polarization (AOP), Stokes parameters ($S_1$, $S_2$, $S_3$) and degree of polarization (DOP), etc. One can select the images with the best contrast for various purposes. The image of DOLP showed superior contrast compared to other images for defects and edge detection. Using a standard edge detection algorithm (Canny in Matlab), results from intensity image were shown to miss edges and corners due to low contrast, while the DOLP image clearly displayed all edges and corners. Additionally, its high contrast also makes it possible to identify the deep scratch and scatters introduced on the mirror surface. Thus, the AOP image has a superior contrast to distinguish the sky, clouds and the mirror. This may serve to provide a good reference for cloud tracking purposes. The polarimetric images were taken using a commercial camera with a linear polarizer and a quarter waveplate, with mechanical rotation of the quarter waveplate.

Polarimetric Imaging for Mirror Soiling Condition Monitoring

Preliminary studies were performed to analyze mirror soiling condition. A piece of mirror from a broken CSP collector was provided. Four soiling conditions were generated by blowing sand onto four parts of the mirror with a hairdryer. Microscope images and reflection spectra of mirror surfaces with four different soiling conditions were taken, and polarimetric imaging results were analyzed. It was found that the DOP image shows the best contrast between clean mirror surface (Region 1, R=100%, average SOP=0.53) and dirty mirror surface (Region 3 and 4 with R=92%, 85%, average SOP=0.42, 0.47, respectively). The DOLP image does not show as much contrast for Region 3 and 4.

Polarimetric Images of Solar Receiver Tubes

Solar receiver tubes were prepared by spraying black paint onto metallic tubes to achieve a black surface. Conventional visible images of these tubes usually did not show strong contrast for cracks or scratches unless there is a strong color contrast. In comparison, the SOP image taken by a visible polarimetic camera showed strong contrast for all, independent of color contrast. Polarimetric thermal images and conventional thermal images were also compared, and it was found that the polarimetric thermal images revealed cracks which were not visible in conventional thermal images.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A polarimetric imaging system for providing thermal and visual imaging of a concentrating solar power plant, the system comprising:
   polarimetric imaging drones configured for imaging visible and infrared wavelengths received from one or more components of the concentrating solar power plant, wherein the one or more components comprise one or more heliostats and/or one or more receiver tubes;
   algorithms for autonomous detection; and
   measurement protocols,
   wherein the polarimetric imaging system is configured to:
   receive one or more visible polarimetric images and one or more infrared polarimetric images of the one or more components of the concentrating solar power plant from the polarimetric imaging drones;
   detect edges and corners of the heliostats with a detection speed of less than about one second of receiving the one or more visible polarimetric images and the one or more infrared polarimetric images, and/or detect a peak flux of the one or more receiver tubes, and,
   identify one or more errors, defects, and/or soiling conditions of the one or more components of the concentrating solar power plant from the one or more visible polarimetric images and the one or more infrared polarimetric images.

2. The polarimetric imaging system of claim 1, further comprising a controller.

3. The polarimetric imaging system of claim 1, wherein the polarimetric imaging system is configured to detect facets of the concentrating solar power plant.

4. The polarimetric imaging system of claim 1, wherein the polarimetric imaging system is configured to monitor mirror soiling and solar-weighted reflectance of the concentrating solar power plant.

5. The polarimetric imaging system of claim 1, wherein the polarimetric imaging system is configured to inspect and monitor receivers of the concentrating solar power plant to detect hot spots, tube defects, and paint degradation.

6. The polarimetric imaging system of claim 1, wherein at least part of the polarimetric imaging system is coupled to a power tower.

7. A method of imaging a portion of the concentrating solar power plant, the method comprising focusing the polarimetric imaging drones of the polarimetric imaging system of claim 1 on at least a portion of the concentrating solar power plant.

8. A polarimetric imaging system for providing thermal and visual imaging of a concentrating solar power plant, the system comprising:
   a plurality of polarimetric imaging devices configured for imaging visible and infrared wavelengths received from one or more components of the concentrating solar power plant, wherein the one or more components comprise one or more heliostats and/or one or more receiver tubes; and,
   a controller operably connected, or connectable, to the plurality of imaging devices, which controller comprises, or is capable of accessing, computer readable media comprising non-transitory computer executable instructions which, when executed by at least one electronic processor, perform at least:
   receiving one or more visible polarimetric images and one or more infrared polarimetric images of the one or more components of the concentrating solar power plant from the plurality of polarimetric imaging devices;
   detecting edges and corners of the heliostats with a detection speed of less than about one second of receiving the one or more visible polarimetric images and the one or more infrared polarimetric images, and/or detecting a peak flux of the one or more receiver tubes, and,
   identifying one or more errors, defects, and/or soiling conditions of the one or more components of the concentrating solar power plant from the one or more visible polarimetric images and the one or more infrared polarimetric images.

9. The polarimetric imaging system of claim 8, wherein one or more of the plurality of polarimetric imaging devices are mounted onto unmanned autonomous vehicles (UAVs).

10. The polarimetric imaging system of claim 8, wherein one or more of the plurality of polarimetric imaging devices are mounted onto one or more power towers of the concentrating solar power plant.

11. The polarimetric imaging system of claim 8, wherein one or more of the plurality of polarimetric imaging devices comprise one or more full-stokes polarimetric imaging sensors.

12. The polarimetric imaging system of claim 8, wherein one or more of the plurality of polarimetric imaging devices comprise one or more integrated silicon metasurfaces with metallic nanowire polarizers.

13. The polarimetric imaging system of claim 8, wherein one or more of the plurality of imaging devices comprise one or more CMOS image sensors.

14. The polarimetric imaging system of claim 8, wherein the controller is configured to identify the one or more errors, defects, and/or soiling conditions in less than about 1 second of receiving the one or more visible and infrared images and with a probability of detection of more than about 0.95.

15. The polarimetric imaging system of claim 8, wherein the controller is configured to receive different polarization parameters selected from the group consisting of: intensity, degree of linear polarization (DOLP), angle of polarization (AOP), Stokes parameters ($S_0$, $S_1$, $S_2$, $S_3$), and degree of polarization (DOP).

16. A method of conducting an autonomous concentrating solar power field inspection using a plurality of polarimetric imaging devices, the method comprising:

receiving one or more visible polarimetric images and one or more infrared polarimetric images of one or more components of the concentrating solar power plant from the plurality of polarimetric imaging devices, wherein the one or more components comprise one or more heliostats and/or one or more receiver tubes;

detecting edges and corners of the heliostats with a detection speed of less than about one second of receiving the one or more visible polarimetric images and the one or more infrared polarimetric images, and/or detecting a peak flux of the one or more receiver tubes, and, identifying one or more errors, defects, and/or soiling conditions of the one or more components of the concentrating solar power plant from the one or more visible polarimetric images and the one or more infrared polarimetric images.

* * * * *